US010104017B2

(12) United States Patent
Berman

(10) Patent No.: US 10,104,017 B2
(45) Date of Patent: Oct. 16, 2018

(54) METHODS, SYSTEMS AND APPARATUS FOR THE VIRTUALIZATION OF HIGH PERFORMANCE NETWORKS

(71) Applicant: JEDA NETWORKS, INC., Newport Beach, CA (US)

(72) Inventor: Stuart B. Berman, Newport Beach, CA (US)

(73) Assignee: JEDA NETWORKS, INC., Newport Beach, CA (US)

( * ) Notice: Subject to any disclaimer, the term of this patent is extended or adjusted under 35 U.S.C. 154(b) by 0 days.

(21) Appl. No.: 15/151,242

(22) Filed: May 10, 2016

(65) Prior Publication Data

US 2016/0337272 A1 Nov. 17, 2016

Related U.S. Application Data

(60) Provisional application No. 62/160,108, filed on May 12, 2015.

(51) Int. Cl.
| | | |
|---|---|---|
| *G01R 31/08* | (2006.01) | |
| *H04L 12/931* | (2013.01) | |
| *H04L 12/741* | (2013.01) | |
| *H04L 12/721* | (2013.01) | |
| *H04L 12/947* | (2013.01) | |
| *H04L 29/12* | (2006.01) | |

(52) U.S. Cl.
CPC ............ *H04L 49/70* (2013.01); *H04L 45/66* (2013.01); *H04L 45/72* (2013.01); *H04L 45/745* (2013.01); *H04L 49/25* (2013.01); *H04L 61/2007* (2013.01); *H04L 61/6031* (2013.01); *H04L 61/6045* (2013.01); *Y02D 30/30* (2018.01)

(58) Field of Classification Search
CPC .......................... H04L 45/7457; H04L 45/44
USPC .................................................. 370/252–392
See application file for complete search history.

(56) References Cited

U.S. PATENT DOCUMENTS

| | | | |
|---|---|---|---|
| 2015/0009994 A1* | 1/2015 | Keesara | H04L 45/12 370/392 |
| 2016/0087845 A1* | 3/2016 | Kaneriya | H04L 49/351 370/254 |
| 2016/0285972 A1* | 9/2016 | Puttagunta | H04L 67/1097 |

* cited by examiner

*Primary Examiner* — Iqbal Zaidi
(74) *Attorney, Agent, or Firm* — David B. Murphy; O'Melveny & Myers LLP

(57) ABSTRACT

Methods, apparatus, and systems create virtualized networks within a physical network. These virtualized networks can support multiprotocols such as iSCSI, RoCE, NFS, or other high performance protocols. The virtualized subnetwork may contain enhanced separation capabilities from the larger network as well as automated creation. A method is provided for forwarding iSCSI frames by a switch. The methods consist of receiving commands at the switch to configure the ternary content addressable memory (TCAM) tables from a software defined network controller. An iSCSI frame is received by the switch from a first iSCSI device coupled to the switch. The switch looks up and matches the received iSCSI frame by one or more of the fields in a TCAM table entry. The TCAM table entry preferably is added from a command send from the software defined network controller. The received iSCSI frame is forwarded to a second iSCSI device coupled to the switch.

4 Claims, 21 Drawing Sheets iscsi_sw_mgr composition
Dependencies

Fabric + Switch + Switch >> Protocol >> Fabric >> Switch >> Switch + DD set + Device >> Device
added added reachable    security      activated  activated  configured activated   Pair      rules
1900  1901  1902          rules        (any time   1905       1906       (any time)  present   pushed
                          pushed       after adding)                     1907        1908      for fabric
                          1903         1904                                                    1909

Fig. 19

METHODS, SYSTEMS AND APPARATUS FOR THE VIRTUALIZATION OF HIGH PERFORMANCE NETWORKS

PRIORITY CLAIM

This application claims priority to and benefit of U.S. Provisional Application No. 62/160,108, filed May 12, 2015, the content of which is incorporated by reference in its entirety as if fully set forth herein.

FIELD OF THE INVENTION

The disclosures and embodiments of the invention relate to network systems and communications networks, more particularly, certain embodiments of the invention relate to a method and system for virtualizing networks within a larger physical network.

BACKGROUND OF THE INVENTION

There are many different protocols that are found in today's Data Center and Cloud network environments. In many cases these protocols coexist and share the same communications networks. The more ubiquitous of the communications network, the Local Area Network (LAN), is usually based on the Ethernet protocol. Over the Ethernet protocol, servers communicate with other servers and servers communicate with storage devices or storage arrays. The server to storage device connections usually have specific performance requirements. These requirements can be characterized by metrics that can include latency, bandwidth, lossless-ness and multiple paths to the same destination. Server to storage device networks are usually called storage networks. The converging or merging the computer and storage networks has created additional complexity in the management, control, and data switching areas.

In parallel with the innovations around converging the computer and storage networks, there have also been a trend to virtualize servers, i.e., consolidate a corporation's many underutilized servers onto fewer more utilized servers. The server virtualization trend has many advantages, including more utilization of existing under utilized servers, lower equipment space, power, and cooling requirements since there are fewer servers. This trend results in fewer and higher utilized servers which have changed the traffic characteristics of the Local Area Network that interconnects them. The traffic requirements which used to be flowing from Internet to Server have changed to an any-to-any server flow. This migration in traffic patterns has produced a trend to "flatten" LANs, i.e., consolidate the normally three layers (core, distribution, and access) of switches commonly found in a Data Center to two layers (core and access). In parallel with this physical flattening trend is the trend towards utilizing layer 2 forwarding methods to keep the network in a single broadcast domain, which, helps support any-to-any connection requirements of virtualized servers and their hypervisors. New link level protocols have been defined to accelerate the ability for any-to-any server based virtual machine communications. Many of these new link level protocols need new switch hardware and new ways to manage the resulting network.

FIG. 1 illustrates an Internet Simple Name Server and the connection to iSCSI devices. The Ethernet switch 130 is coupled to an iSNS Server 120 and two iSCSI devices, Device A 100 and Device B 101. Both iSCSI Devices 100 101 communicate with the iSNS Server 120 through the iSNS protocol (iSNSP) 110 111. The iSNSP allows the attached iSCSI devices to discover the existence of each other and how to communicate with them. There are many issues with the implementation of an iSNS controller that is interoperable with the current iSCSI devices.

What is needed is a simpler way to converge compute and storage networks in a satiable and less complex method than with current methods. Both simpler methods need to be easily managed, scalable, and interoperable. Accomplishing this would accelerate the compute and network convergence trend and accelerate the flattening of the LAN to more easily attain the benefits of visualization, convergence, and consolidation.

BRIEF SUMMARY OF THE INVENTION

Methods, apparatus, systems, and products are disclosed for creating virtual networks within a larger physical network. Automation, security and separation in the creation of virtualized networks by a software based controller.

In one aspect, a system is provided for interconnecting iSCSI devices. A first iSCSI device, a second iSCSI device, and a software defined network controller (SDNC) apparatus, cooperate with a switch. The switch comprises a first port adapted to transmit and receive iSCSI frames, the first iSCSI device is coupled to the first port of the switch and a second port adapted to transmit and receive iSCSI frames, the second iSCSI device is coupled to the first port of the switch. The software defined network controller apparatus is coupled to the switch. The SDNC communicates with the first iSCSI device and the second iSCSI device to send commands to notify the iSCSI devices with information about each other. The software defined network controller communicates with the switch, providing configuration parameters to allow the first iSCSI device to communicate with the second iSCSI device through the switch. In one embodiment, the software defined network controller sends commands to the switch tertiary content addressable memory (TCAM) tables.

In yet another aspect of the invention, a method is provided for forwarding iSCSI frames by a switch. The method consists of receiving commands at the switch to configure the TCAM tables from a software defined network controller. An iSCSI frame is received by the switch from a first iSCSI device coupled to the switch. The switch looks up and matches the received iSCSI frame by one or more of the fields in a TCAM table entry. The TCAM table entry preferably is added from a command send from the software defined network and roller. The received iSCSI frame is forwarded to a second iSCSI device coupled to the switch.

BRIEF DESCRIPTION OF THE DRAWINGS

The drawings illustrate only exemplary embodiments of the invention and therefore do not limit its scope because the inventive concepts lend themselves to other equally effective embodiments.

FIG. 19 is a diagram showing the Software Defined Controller dependencies for certain network and device actions.

ACRONYMS

Figure 1:
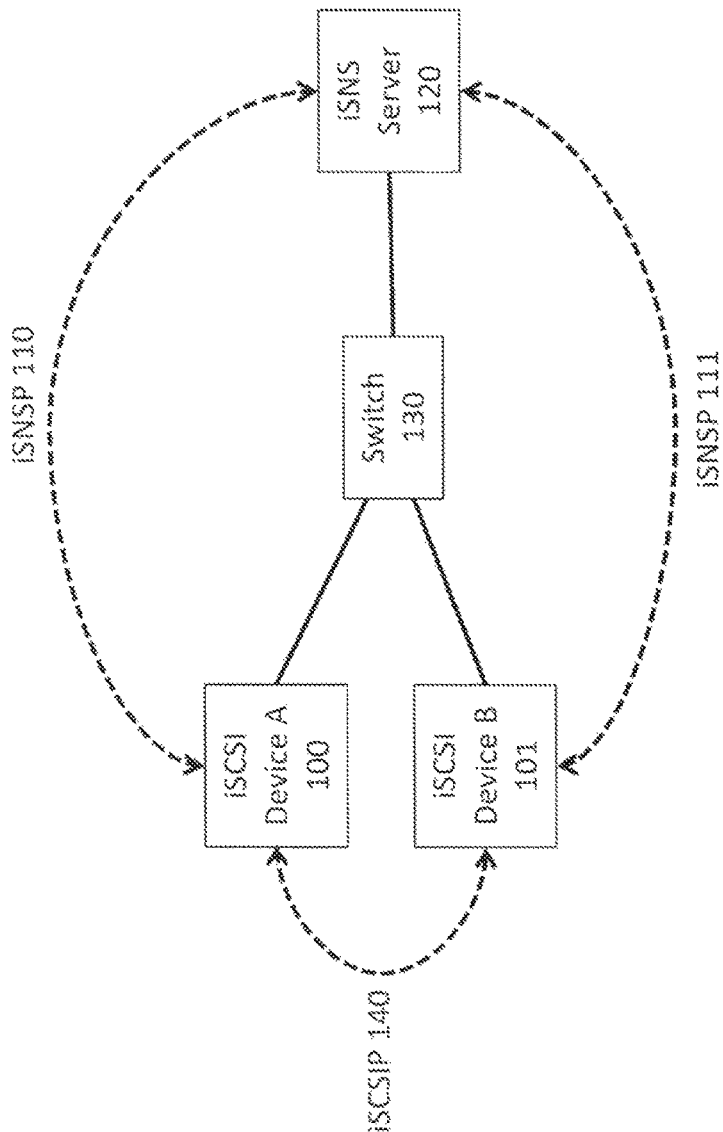
FIG. 1 illustrates an Internet Simple Name Server and the connection to iSCSI devices.

ACE Access Control Entry
ACL Access Control List
ACLE Access Control List Entry
COS Class of Service
CNA Converged Network Adapter
DCB Data Center Bridging
DCBx DCB Exchange protocol (or DCBX)
ETS Enhanced Transmission Selection (IEEE 802.1Qaz)
FIB Forwarding Information Base
IEEE Institute of Electrical and Electronics Engineers
ISL Interswitch link
IP Internet Protocol
LACP Link Aggregation Control Protocol
LAG Link Aggregation Group
LAN Local Area Network
LLDP Link Level Discovery Protocol
MAC Media Access Control
MTU Maximum Transfer Unit
PDU Protocol Data Unit
PHY Physical Layer
PPP Point-to-Point Protocol
PFC Priority-based How Control (IEEE 802.1Qbb, 802.3bd)
QOS Quality of Service
SDFN Software Defined Network Controller
SFLOW Sampled Flow
SNMP Simple Network Management Protocol
STP Spanning Tree Protocol
TCAM Ternary Content Addressable Memory
VID VLAN Identifier
VLAN Virtual Local Area Network
VRP VLAN Registration Protocol
vSwitch Virtual Switch

DEFINITIONS

Access control lists (ACL): are comprised of Access Control Entries (ACE), allow network managers to define classification actions and rules for specific ports, IP addresses, MAC addresses or any other frame field. Frames entering the port, with an active ACL, are either admitted or denied entry.

Content Addressable Memory (CAM): Content-addressable memory (CAM) is a computer memory used in certain searching applications. It compares input search data (tag) against a table of stored data, and returns the address of matching data (or in the case of associative memory, the matching data). Ternary Content Addressable Memory, or TCAM, is a component of a router. It is a powerful and fast hardware lookup engine for IP Prefixes. TCAM has historically been used to perform hardware-table-lookups of Access-list, Netflow or QoS tables in routers and switches.

Core Ethernet Switch: a high-capacity switch generally positioned within the backbone or physical core of a network.

Discovery Domains (DD); are a security and management mechanism used to administer access and connectivity to devices.

Discovery Domain Set (DDS): is a container object for Discovery Domains (DDs). DDSs may contain one or more DDs. Similarly, each DD can be a member of one or more DDSs. DDSs are a mechanism to store coordinated sets of DD mappings.

Domain Identifier: Bits 23 through 16 of an address identifier.

Forwarding Information Base (FIB): A FIB, also known as a forwarding table, is most commonly used in network bridging, routing, and similar functions to find the proper interface to which the input interface should forward a packet.

Frame Match Entry (FME): A FME is send from a FIAC Controller to a HA. The FME consists of match fields, counters, and actions. The match fields are applied against an incoming frame. The match fields consist of the ingress port and frame headers. The actions include instructions on how to handle the incoming frame and the counters are statistics tables.

Internet Simple Name Server (iSNS): Provides management services similar to those found in Fibre Channel networks, allowing a standard IP network to operate in much the same way that a Fibre Channel storage area network does. The ISNS uses a special protocol, the iSNS protocol (iSNSP), to communicate with iSCSI devices. The ISNSP allows automated discovery, management and configuration of iSCSI and Fibre Channel devices on a TCP/IP network.

Internet Small Computer System Interface (iSCSI): is an Internet Protocol (IP) based storage networking standard for linking data storage facilities. By carrying SCSI commands over IP networks, iSCSI is used to facilitate data transfers over intranets to manage storage over long distances, iSCSE can be used to transmit data over local area networks (LANs), wide area networks (WANs), or the Internet and can enable location-independent data storage and retrieval. The protocol allows clients (called initiators) to send SCSI commands (CDBs) to SCSI storage devices (targets) on remote servers. It is a storage area network (SAN) protocol, allowing organizations to consolidate storage into data center storage arrays while providing hosts (such as database web servers) with the illusion of locally attached disks.

iSCSI Extensions for RDMA (iSER): iSER is a computer network protocol that extends the iSCSI protocol to use Remote Direct Memory Access (RDMA). RDMA is provided by either the Transmission Control Protocol (TCP) with RDMA services (iWARP), RoCE (RDM A over converged Ethernet) that does not need the TCP layer and therefore provides lower latency, or InfiniBand. It permits data to be transferred directly into and out of SCSI computer memory buffers (which connects computers to storage devices) without intermediate data copies.

Link Level Discovery Protocol (LLDP): LLDP is a vendor-neutral link layer protocol in the Internet Protocol Suite used by network devices for advertising their identity, capabilities, and neighbors on a local area network, principally wired Ethernet. The protocol is referred to by the IEEE as Station and Media Access Control Connectivity Discovery specified in the IEEE standards document.

Lossless Ethernet bridging element: An Ethernet bridging function operating across Lossless Ethernet MACs.

Lossless Ethernet MAC: A full duplex Ethernet MAC implementing extensions to avoid Ethernet frame loss due to congestion (e.g., the PAUSE mechanism (see IEEE 802.3-2008) or the Priority-based Flow Control mechanism (see IEEE 802.1Qbb)).

Maximum Transfer Unit (MTU): MTU is the size in bytes of the largest protocol data unit that can pass onwards.

Network Attached Storage (HAS): NAS is a file-level computer data storage server connected to a computer network providing data access to a heterogeneous group of clients. NAS not only operates as a file server, but is specialized for this task either by its hardware, software or configuration of those elements. NAS can be a computer appliance—a specialized computer built from the ground up for storing and serving files—or software that can be installed on a server.

Network Function Virtualization (NFV): NFV is a network architecture concept that proposes using IT virtualization related technologies to virtualized entire classes of network node functions into building blocks that may be connected, or chained, to create communication services, NFV relies upon, but differs from, traditional server virtualization techniques such as those used in enterprise IT, A virtualized network function, or VNF, may consist of one or more virtual machines running different software and processes, on top of industry standard high volume servers, switches and storage, or even cloud computing infrastructure, instead of having customer hardware appliances for each network function.

Non-Volatile Memory Express (NVMe): NVMe is a host controller interface specification (NVMHQ) for accessing solid-state drives (SSDs) attached through the PCI Express (PCIe) bus. "NVM" stands as an acronym for non-volatile memory, which is used in SSDs. As a logical device interface, NVM Express has been designed from the ground up, capitalizing on the low latency and parallelism of PCI Express SSDs, and mirroring the parallelism of contemporary CPUs, platforms and applications. By allowing parallelism levels offered by SSDs to be fully utilized by host's hardware and software. NVM Express brings various performance improvements.

NVMe over Fabrics: NVMe over Fabrics extends the benefits of NVM Express (NVMe) to usages with hundreds of solid state drives where using a fabric as an attach point is more appropriate that using PCI Express, as in flash appliances that uses fabrics such as Ethernet with RDMA, InfiniBand. Intel Omni Scale Fabric, among others.

Path selection: Path Selection is the process by which a Switch determines the best, path from a source domain to a destination domain. These paths may then be used in any appropriate manner by the Switch to move frames to their destinations. This path selection process does not require nor preclude the use of static or dynamic load balancing.

Physical Network: A physical topology is how they are actually interconnected with wires, wireless and cables.

Remote Direct Memory Access (RDMA): RDMA is a direct memory access from the memory of one computer into that of another without involving either one's operating system. This permits high-throughput, low-latency networking, which is especially useful in massively parallel computer clusters.

RDMA over Converged Ethernet. (RoCE): RoCE is a network protocol that allows remote direct memory access (RDMA) over an Ethernet network. There exists two RoCE versions, namely RoCE v1 and RoCE v2. RoCE v1 is a link layer protocol and hence allows communication between any two hosts in the same Ethernet broadcast domain. RoCE v2 is an internet layer protocol which means that RoCE v2 packets can be routed. Although the RoCE protocol which means that RoCE v2 packets can be routed. Although the RoCE protocol benefits from the characteristics of a converged Ethernet network, the protocol can also be used on a traditional or non-converged Ethernet network.

Router: a device that performs forwarding of IP (L3) packets, based on L3 addressing and forwarding information. Routers forward packets from one L2 broadcast domain to another (one, or more in the IP multicast case)—distinct—L2 broadcast domain(s). A router terminates an L2 broadcast domain.

Sample Flow (sFlow): sFlow is an industry standard for packet export at Layer 2 of the OSI model. It provides a means for exporting truncated packets, together with interface counters. Maintenance of the protocol is performed by the sFlow.org consortium.

Top of Rack Switch (TOR): A TOR switch is an Ethernet switch that sits on the very lop or near the top of a Telco or equipment rack you see in Data Centers, Co-location or other computer center facilities.

Scale out Storage: a storage system that uses a scaling methodology to create a dynamic storage environment that will support balanced data growth on an as-needed basis. Scale-out storage architecture uses a number of storage nodes consisting of multiple low-cost computer servers and storage components that are configured to create a storage pool.

Software Defined Networking (SDN): SDN is an approach to computer networking that allows network administrators to manage network services through abstraction of lower-level functionality. This is done by decoupling the system that makes decisions about where traffic is sent (the control plane) from the underlying systems that forward traffic to the selected destination (the data plane).

Software Defined Network Controller (SDNC): An SDNC is an application in software that manages flow control to enable intelligent networking. SDNC's are based on protocols, such as Open Row, SNMP, HTTP/HTTPS, JSON, for example, that tell switches where to send packets. An SDNC may implement control plane features, in this patent, SDNC may also describe a combined SDN and NFV controller.

Software Defined Storage: uses software to manage policy based provisioning and management of data storage independent of the underlying hardware. Software defined storage definitions typically include a form of storage virtualization to separate the storage hardware from software that manages the storage infrastructure.

Spanning Tree Protocol (STP): is a network protocol that ensures a loop-free topology for any bridged Ethernet local area network. The basic function of STP was to prevent bridge loops and the broadcast radiation that results from thorn.

Spine/Leaf Topology: is a two layer network topology composed of leaf switches and spine switches. Servers and storage connect to leaf switches and leaf switches connect to spine switches. Leaf switches mesh into the spine, forming the access layer that delivers network connection points for servers. Spine switches have high port density and form the core of the architecture.

Unicast MAC address: A MAC address associated with a particular Ethernet station on an Ethernet network and called an Individual Address in IEEE 802.3-2008.

Virtual Switch: is a software program that allows one virtual machine (VM) to communicate with another virtual machine (VM). A virtual machine can intelligently direct communication on the network by inspecting packets before passing them on.

Virtual Network: A virtual network has a computer network that consists, at least in part, of virtual network links. A virtual network link is a link that does not consist of a physical (wired or non-wired) connection between two computing devices but is implemented rising methods of network virtualization. Two common forms of network virtualized are protocol-based virtual networks, (such as VLANs, VPNs, and VFLSs) and virtual networks that are based on virtual devices (such as the networks connecting virtual machines inside a hypervisor). In practice, both forms can be used in conjunction.

Zone: A group of Zone Members. Members of a Zone are made aware of each other, but not made aware of Zone Members outside the Zone.

Zone Definition: The parameters that define a Zone.

Zone Member: The specification of a device to be included in a Zone.

DETAILED DESCRIPTION OF THE INVENTION

Figure 2:
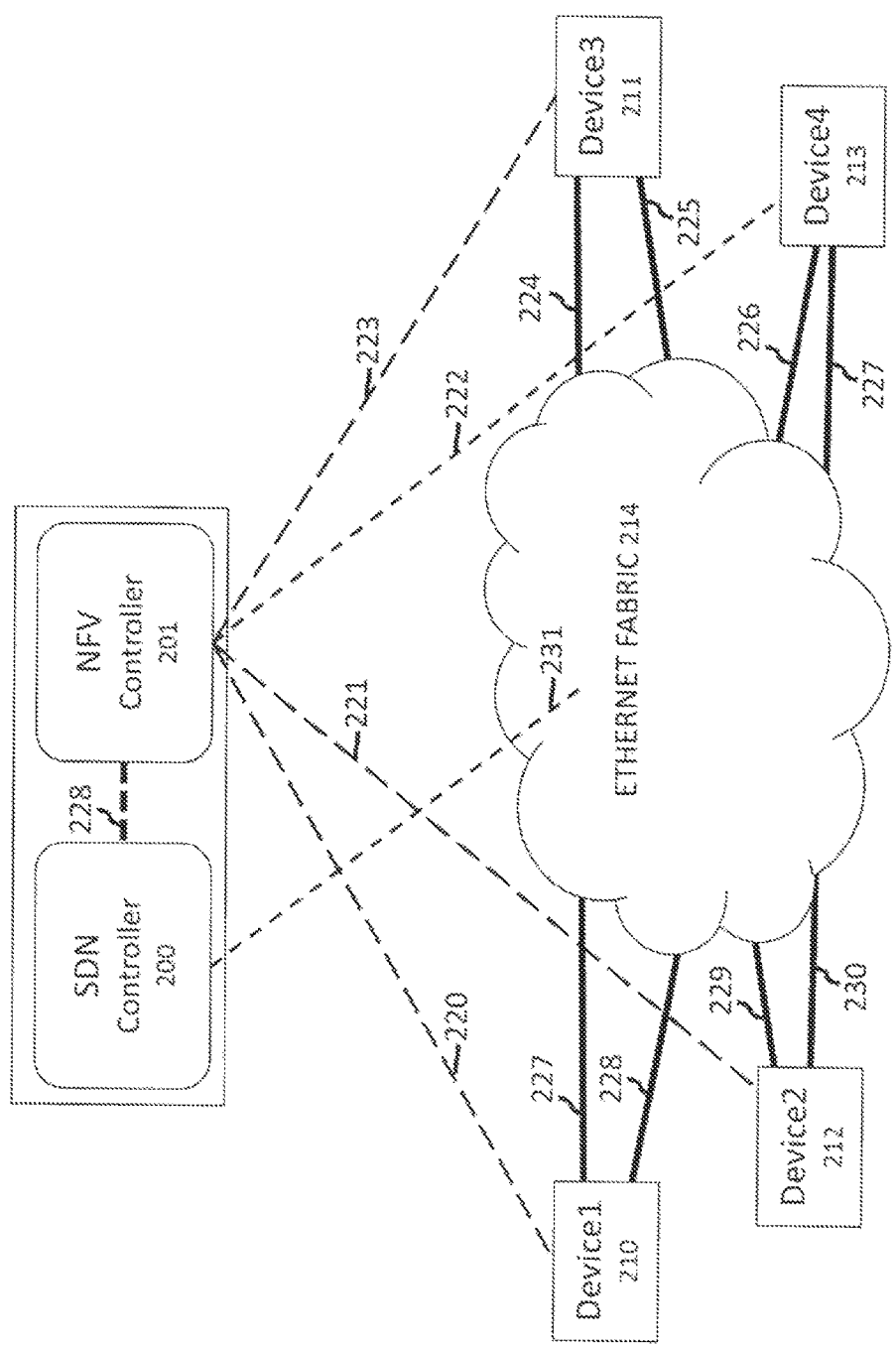
FIG. 2 shows an SDN and NFV controller coupled with an Ethernet fabric and end devices.

FIG. 2 shows an SDN 200 and NFV 201 controller coupled 231 220 221 222 223 with an Ethernet fabric 214 and end devices 210 211 212 213. The end devices are coupled 227 228 229 230 224 225 226 227 with the Ethernet Fabric 214. The SDN controller 200 provides one or more of the following capabilities: Ethernet Fabric Health Monitoring, SDN Controller high availability (non-disruptive/all-over, auto-restart upon controller code/module error), hot code/firmware upgrade/downgrade, Ethernet switch TCAM management, intelligent path selection, virtualized network diagnostics, network auto configuration (of one or more of the following parameters: VLANs, PFC, ETS, LLDP, LAGs, ISLs, sFlow, etc). The NFV controller 201 may contain service plugin modules that support multiple protocols such as FCoE, iSCSI, RoCE, NVMe over Fabrics, NAS, scale out storage controllers. The NFV controller 201 may support one or more of the following capabilities; protocol specific plug-in support, device health monitoring, device initialization, device directory/name services, device security, path QoS, Policy based network. The SDN controller is coupled 200 with the NFV controller 201.

Figure 3:
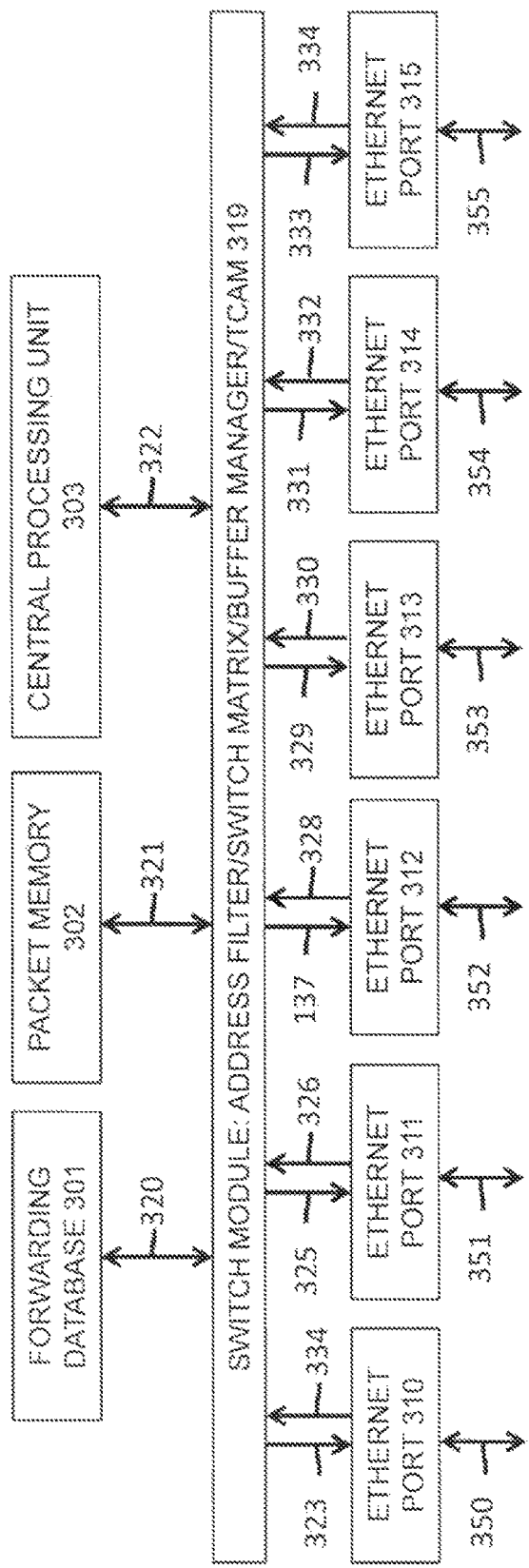
FIG. 3 is a block diagram showing an Ethernet switch and some of the major components.

FIG. 3 is a block diagram showing an Ethernet switch along with the major components. FIG. 3 shows the switch hardware to use the TCAM. The Ethernet switch is composed one or more of the following: Ethernet port logic 310 311 312 313 314 315, a switching module that is composed of one or more of the following, address filter, switch matrix, buffer manager 319, a forwarding database 301, a packet memory 302, a central processing unit 303. The Ethernet ports are coupled to the network or connected devices 350 351 352 353 354 355. The Ethernet port modules are also coupled to the switch module 323 324 325 326 327 328 329 330 331 332 333 334. The switch module 319 is also coupled with the forwarding database 301, packet memory 302 and the central processing unit 303. Packets enter the switch through the Ethernet port modules 310 311 312 313 314 315. Packets then may enter one or more of the following modules: the switch module 319, the packet memory 302, the central processing unit 303, the forwarding database 301.

Figure 4:
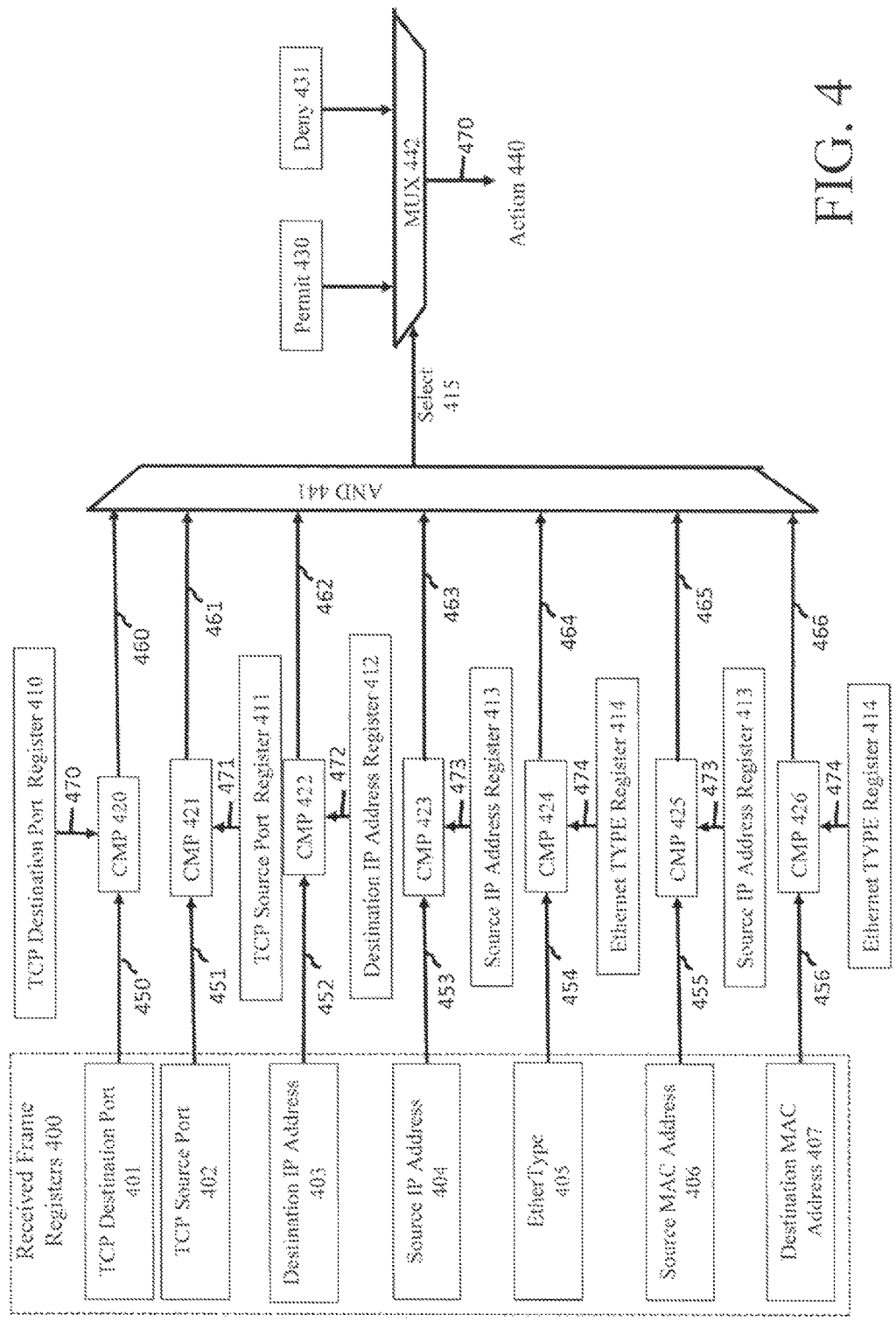
FIG. 4 is a block diagram showing a hardware packet matching apparatus.

FIG. 4 is a block diagram showing a hardware packet matching apparatus. The apparatus consists of registers 400 to hold certain received frame and packet fields that may contain one or more of the following: TCP destination port 401, TCP source port 402, destination IP address 403, source IP address 404, Ethernet type (EtherType) 405, source MAC address 406, destination MAC address 407. The received frame registers 400 are compared 420 421 422 423 424 425 426 with predefined values 410 411 412 413 414 415 416. The results of the comparisons 460 461 462 463 464 465 466 are combined in a logical AND function 441 which is used to select 470 the action 442, which may include permit 430 the packet to be transferred to another switch port or deny 431 the packet to be transferred to another switch port.

Figure 5:
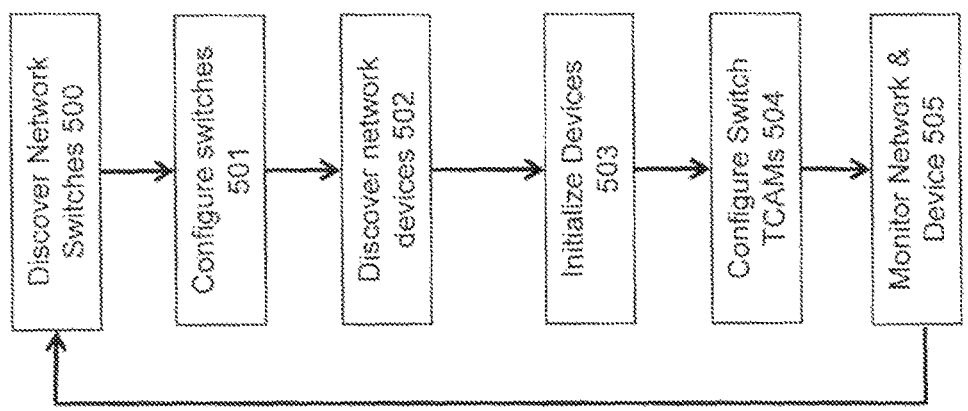
FIG. 5 is a diagram showing the steps to configure a virtual network.

FIG. 5 is a diagram showing the steps to configure a virtual network. Not all steps may be used. Total iSCSI initialization is shown. The first step is to discovery the switches in the network 500. After switch discovery, the switches may be configured 501. Switch configuration may include one or more of the following parameters: VLAN, ETS, PFC, sFlow, ACLs, ACL counters, TCAM, buffer sizes, LAGs, MLAGs, ISLs. Next the network devices may be discovered 502. The network devices may include one or more of the following: iSCSI initiator, iSCSI target, iSER initiator, iSER target, NAS array, NVMe host, NVMe storage device, PCIe switches and/or bridges, FCoE initiators, FCoE targets, RDMA device. Network devices may also be manually added by an network administrator or other user. Next the network devices discovered may be initialized 503. Initialization may include one or more of the following actions: load a driver, configure a driver, activate a driver, add target information such as an IP address or another identifier, query operating system on the network device for storage information such as a LUN, a file system or a directory. Next the switch TCAMs may be configured 504. The configuration parameters may include one or more of the following: adding ACLs to deny specific protocol traffic, adding ACLs to permit specific communications between certain network devices, setting sFlow parameters to monitor certain device flows. Next the network and devices may be monitored 505. The monitoring actions may include one or more of the following: collecting ACL trigger statistics, collecting switch port statistics, collecting sFlow data, collecting switch alerts, collecting device alerts.

Figure 6:
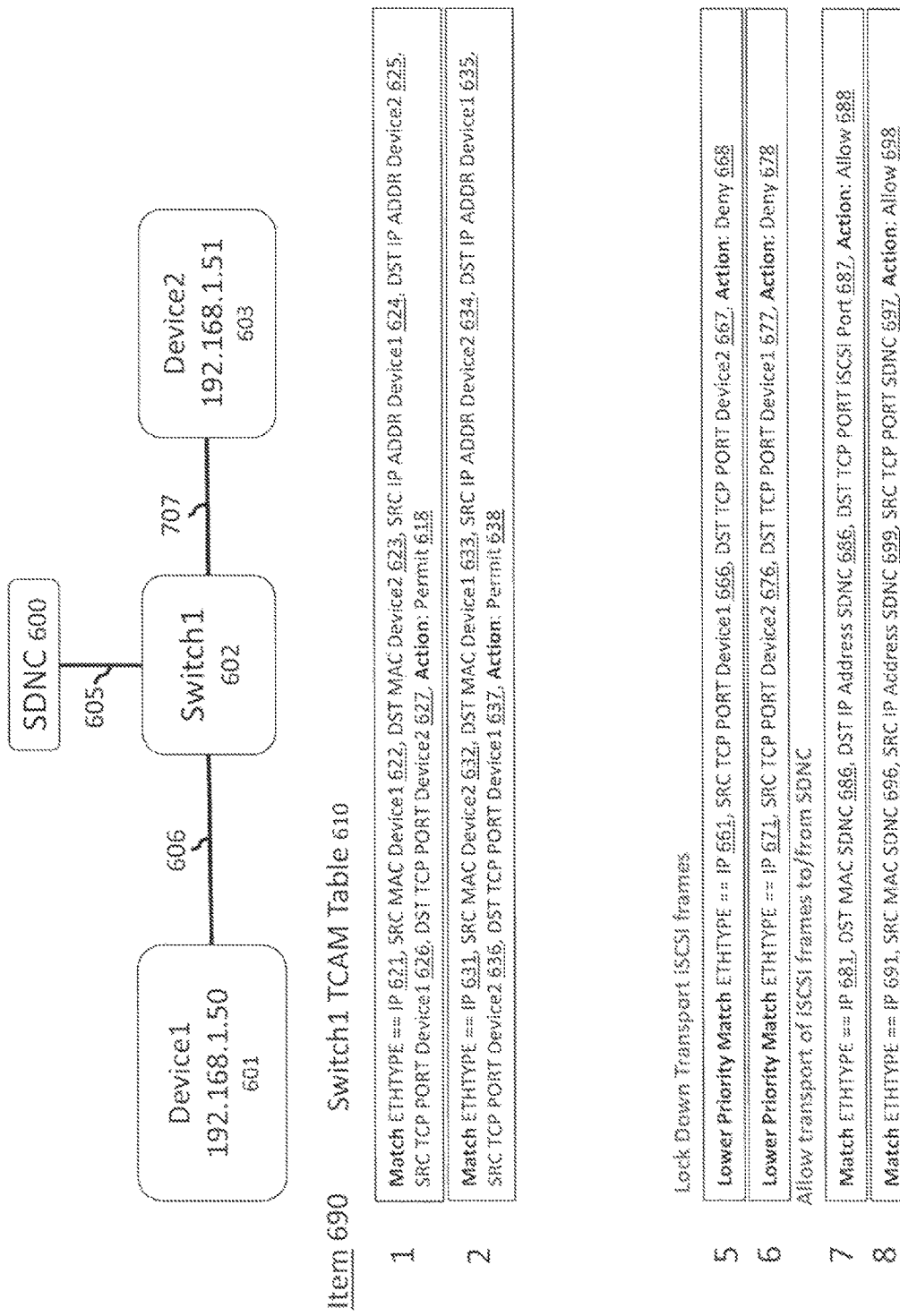
FIG. 6 is a diagram showing a switch TCAM table for a virtual network composed of two devices.

FIG. 6 is a diagram showing a switch 602 TCAM table 610 for a virtual network composed of two devices 601 603. It shows the switch TCAM rules configuration. Device 1 601 has IP address 192.168.1.50 and is coupled 606 to Switch 1 602. Device 2 603 has IP address 192.168.1.51 and is coupled 607 to Switch 1 602. A Software Defined Network Controller, SDNC, 600 is coupled 605 to Switch 1 602. SDNC inserts ACLs into Switch 1's 602 TCAM table 610. The TCAM entries create one or more virtual networks where Device 1 601 can communicate with Device 2 603. This communication can be over multiple protocols, the protocols defined by the TCAM entries. There are eight TCAM entries shown in FIG. 6, labeled in the Item 690 column, one through eight. TCAM entry one shows the following match fields: Ethernet type field (ETHTYPE) equal to the IP protocol type 621, source MAC address equal Device 1 622, destination MAC address equal to Device 2 623, source IP address equal to Device 1 624, destination IP address equal to Device 2 625, source, TCP port equal to Device 1 626, destination TCP port equal to Device 2 627 and the action when all the match fields are correct is to permit tire frame to transit the switch 618. This TCAM entry matches on the packets generated by Device 1 601 destined to Device 2 603 with the specified match fields. TCAM entry two 631, 632, 633, 634, 635, 636, 637, 638, permits packets generated from Device 2 603 to Device 1 601. TCAM entries 5, 661, 666, 667, 668 and 6, 671, 676, 677, 678 serve to lock down, i.e., deny, all iSCSI transport frames to and from other devices. The TCAM entries are of lower priority so they will match when other higher priority TCAM entries such as 1, 2, 3, 4, don't match. TCAM entries 7, 681, 686, 687, 688 and 8, 691, 696, 697, 698, 699 allow iSCSI transport frames to and from the SDNC 600.

In the example in FIG. 6, the TCAM entries support a layer 3 protocol which may include one or more of the following: iSCSI, NFS, CIFS, iWARP, Layer 3 refers to the Network layer of the commonly-referenced multilayered communication model, Open Systems Interconnection (OSI). The Network layer is concerned with knowing the address of the neighboring nodes in the network, selecting routes and quality of service and recognizing and forwarding to the Transport layer incoming messages for local host domains. Specific protocols may be identified by one or more of the following packet header fields: Ethernet type, IP Protocol type, TCP source port number. TCP destination port number. UDP source port number, UDP destination port number, TCP data, UDP application data.

The TCAM insertion method can also be used to create layer 2 virtual networks. Layer 2 refers to the Data Link layer of the commonly-referenced multilayered communication model, Open Systems Interconnection (OSI). The Data Link layer is concerned with moving data across the physical links in the network. In a network, the switch is a device that redirects data messages at the layer 2 level, using the destination MAC address to determine where to direct the message. Layer 2 protocols may include on or more of the following: Fibre Channel over Ethernet (FCoE), NVMe over Fabrics, iSER, RoCE v1, RoCE v2. For Layer 2 protocols the TCAM entries may be a subset of those shown in the Switch 1 TCM table 610. For example, the TCAM entries may not include the IP and TCP packet fields due to the fact they may not be present. For layer 2 Protocols, the Ethernet type, the source MAC address and the destination MAC address may be the only fields required. FCoE may include some fields from the embedded FC frame such as the destination port identifier (D_ID) or the source port identifier (S_ID) fields.

Figure 7:
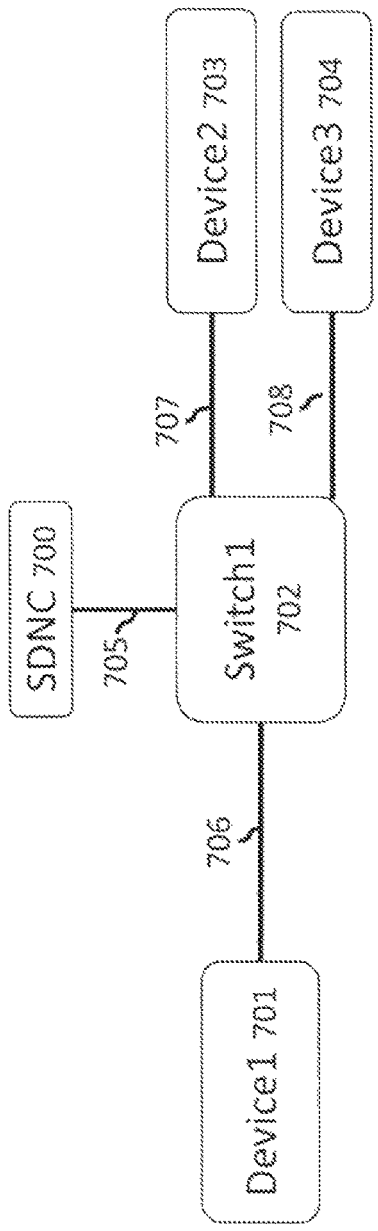
FIG. 7 is a diagram showing a switch TCAM table for a virtual network composed of three devices.

FIG. 7 is a diagram showing a switch 702 TCAM table 710 for a virtual network composed of three devices 701 703 704. Switch 1 702 TCAM table 710 contains 6 entries. This shows the switch TCAM rules configuration. TCAM entry 1, 720, 721, 722, 723, 724, 725, 726, 727, 728, 718 describe iSCSI frames originating from Device 1 701 with a destination of Device 2 703 received over link 706 by Switch 1 702. The TCAM entry permits these frames. TCAM entry 2, 730, 731, 732, 733, 734, 735, 736, 737, 738 describe iSCSI frames originating from a port on Switch 1 702 being sent over link 706. TCAM entry 3, 740, 741, 742, 743, 744, 745, 746, 747, 748 describe iSCSI frames originating from Device 2 703 with a destination of Device 1 701 being sent a link 707 to Switch 1 702. TCAM entry 4, 750, 751, 752, 753, 754, 755, 756, 757, 758 describe iSCSI frames originating from Switch 1 702 with a destination of Device 1 703. TCAM entry 5, 760, 761, 762, 763, 764, 765, 766, 767, 768 describe iSCSI frames originating from Device 3 704 with a destination of Device 1 701. TCAM entry 6, 770, 771, 772, 773, 774, 775, 776, 777, 778 describe iSCSI frames originating from Device 1 701 with a destination to Device 3 704. All the actions in the above example TCAM entries are to permit the frames to pass through Switch 1 702.

Figure 8:
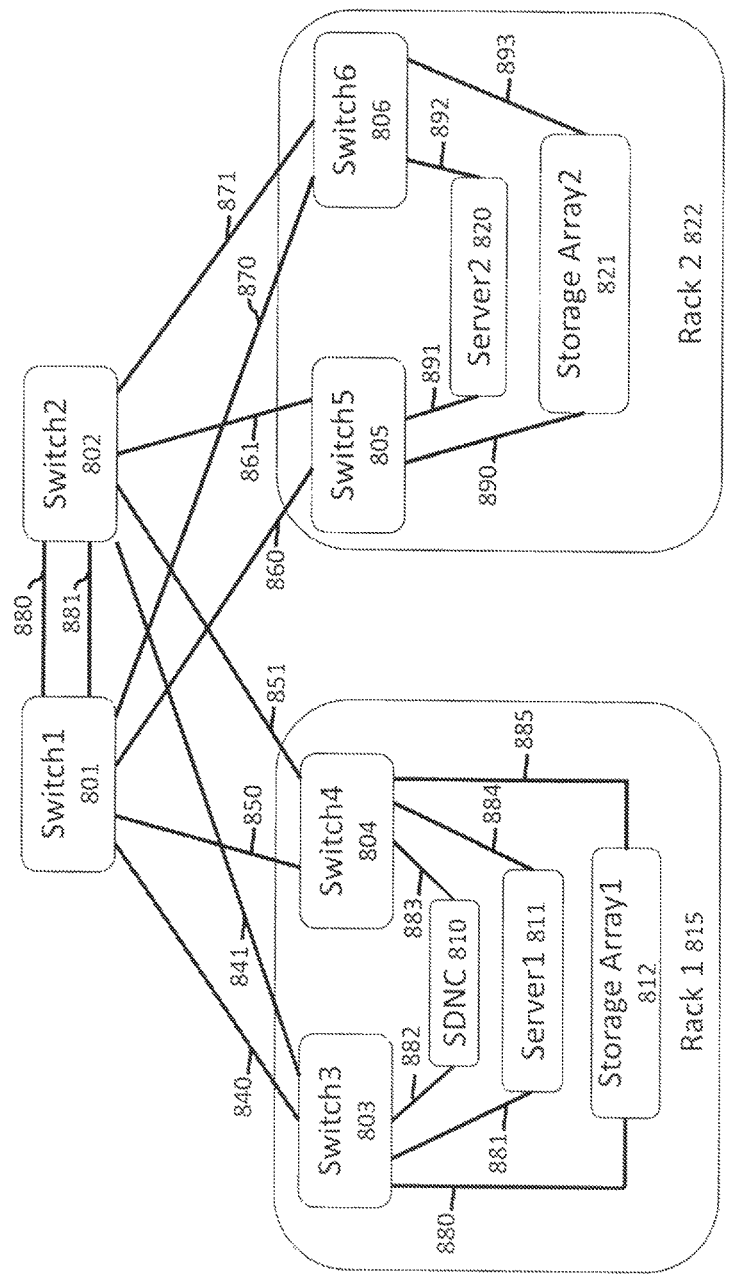
FIG. 8 is a diagram of network core and network edge topology with servers and storage arrays.

FIG. 8 is a diagram of network core and network edge topology with servers and storage arrays. This shows the paths and configurations at a systems level. Switch 1 803 and Switch 2 802 are core switches attached to each other by one or more communication links 880, 881 and to Top of Rack switches, Switch 3 803, Switch 4 804, Switch 5 805, Switch 6 806 through communications links 840, 841, 850, 851, 860, 861, 870, 871. Switch 3 is connected 880 to Storage Array 1 812, to 881 Server 1 811 and to 882 SDNC 810. Switch 4 804 is connected to 883 SDNC 810, to 884 Server 1 811 and to 885 Storage Array 1 812. Switch 5 805 is connected to 880 Storage Array 2 821 and to 891 Server 2 820. Switch 6 806 is connected to 892 Server 2 820 and to 893 Storage Array 2 821.

Figure 9:
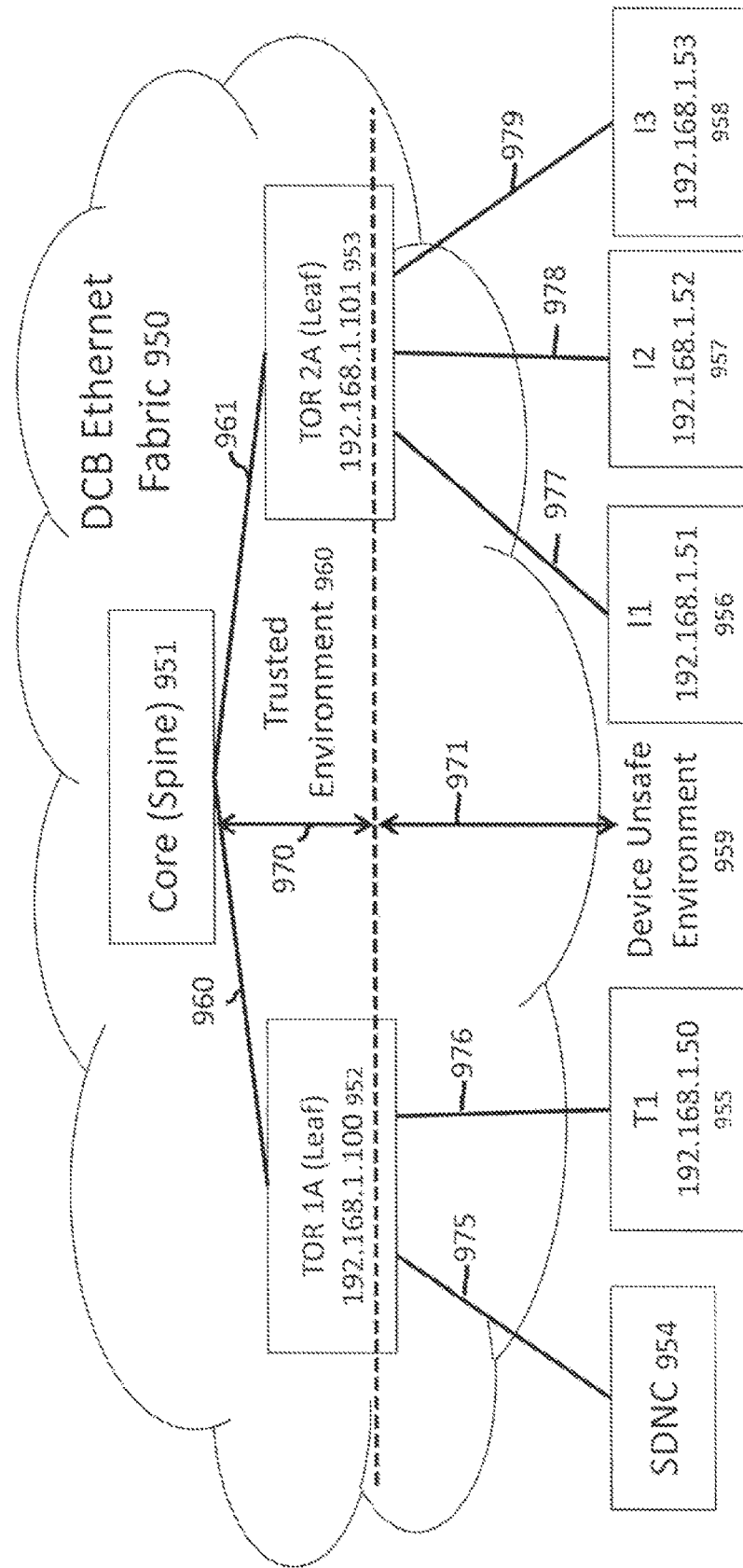
FIG. 9 is a diagram a network topology with devices showing security zones.

FIG. 9 is a diagram a network topology with devices showing security zones. A DCB Ethernet Fabric 950 is composed of at least one Core (spine) switch 951, connected to 960 961 two Top of Rack (TOR) leaf switches, TOR1A 952 and TOR2A 753. TOR1 952 is connected 975 to SDNC 954 and to 976 storage target T1 955. TOR2 953 is connected 977 to storage initiator 11 956, connected 978 to 12 957 and connected 979 to 13 958. FIG. 9 shows a security zone 960 and an unsafe zone 959.

Figure 10:
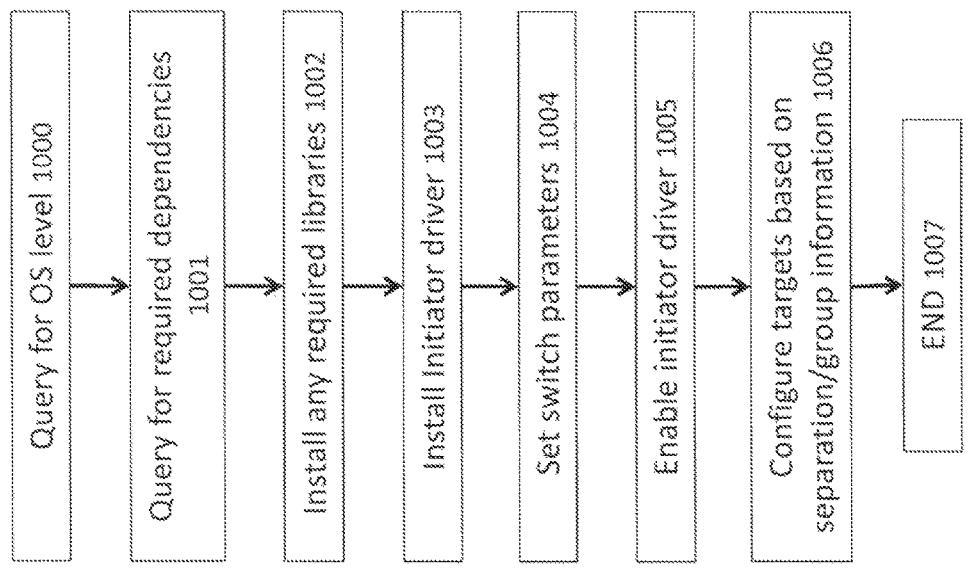
FIG. 10 is a diagram showing the steps to configure an initiator.

FIG. 10 is a diagram showing the steps or script to configure an initiator. The step is to query the device for the OS type and level 1000. The next step is to calculate any required operating system or device dependencies 1001. The next step is to install any required libraries in the device 1002. The next step is to install the device initiator driver 1003. The next step is to set the switch parameters 1004. The next step is to enable the initiator driver 1005. The next step is to configure any storage targets based on separation/group information 1006.

Figure 11:
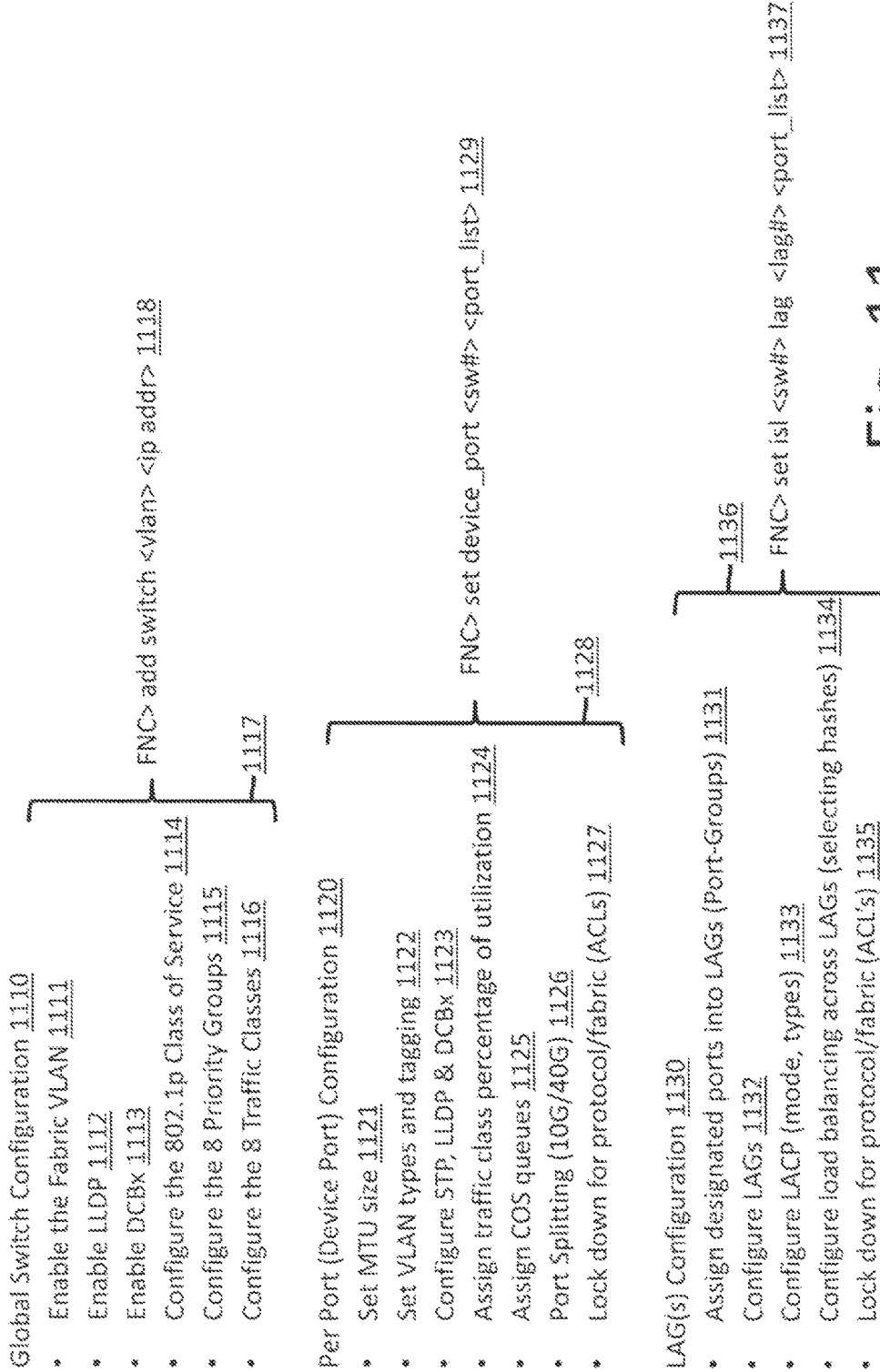
FIG. 11 is a diagram showing the automation of switch configuration steps by the software defined network controller.

FIG. 11 is a diagram showing the automation of switch configuration steps by the software defined network controller. There are three main configuration areas, global switch configuration 1110, per port (device port) configuration 1120 and LAG or LAGs configuration 1130. One command line can automate many manual steps, saving time and potential errors. The Global Switch configuration command 1118 may perform one or more of the following steps 1117: enable the fabric VLAN 1111, enable LLDP 1112, enable DCBx 1113, configure the 802.1p Class of Service 1114, configure the 8 priority groups 1115, configure the 8 traffic classes 1116. The per port configuration command 1129 may perform one or more of the following steps 1128: set MTU size 1121, set VLAN types and tagging 1122, configure STP, LLDP & DCBx 1123, assign traffic class percentage of utilization 1124, assign COS queues 1125, port splitting (10G/40G) 1126, lock down for protocol/fabric (ACLs) 1127. The LAG or LAGs configuration command 1127 may perform one of more of the following steps 1136: assign designated ports into LAGs (Port-Groups) 1131, configure LAGs 1132, configure LACP (mode, types) 1133, configure load balancing across LAGs (selecting hashes) 1134, lock down for protocol/fabric (ACL's) 1135.

Figure 12:
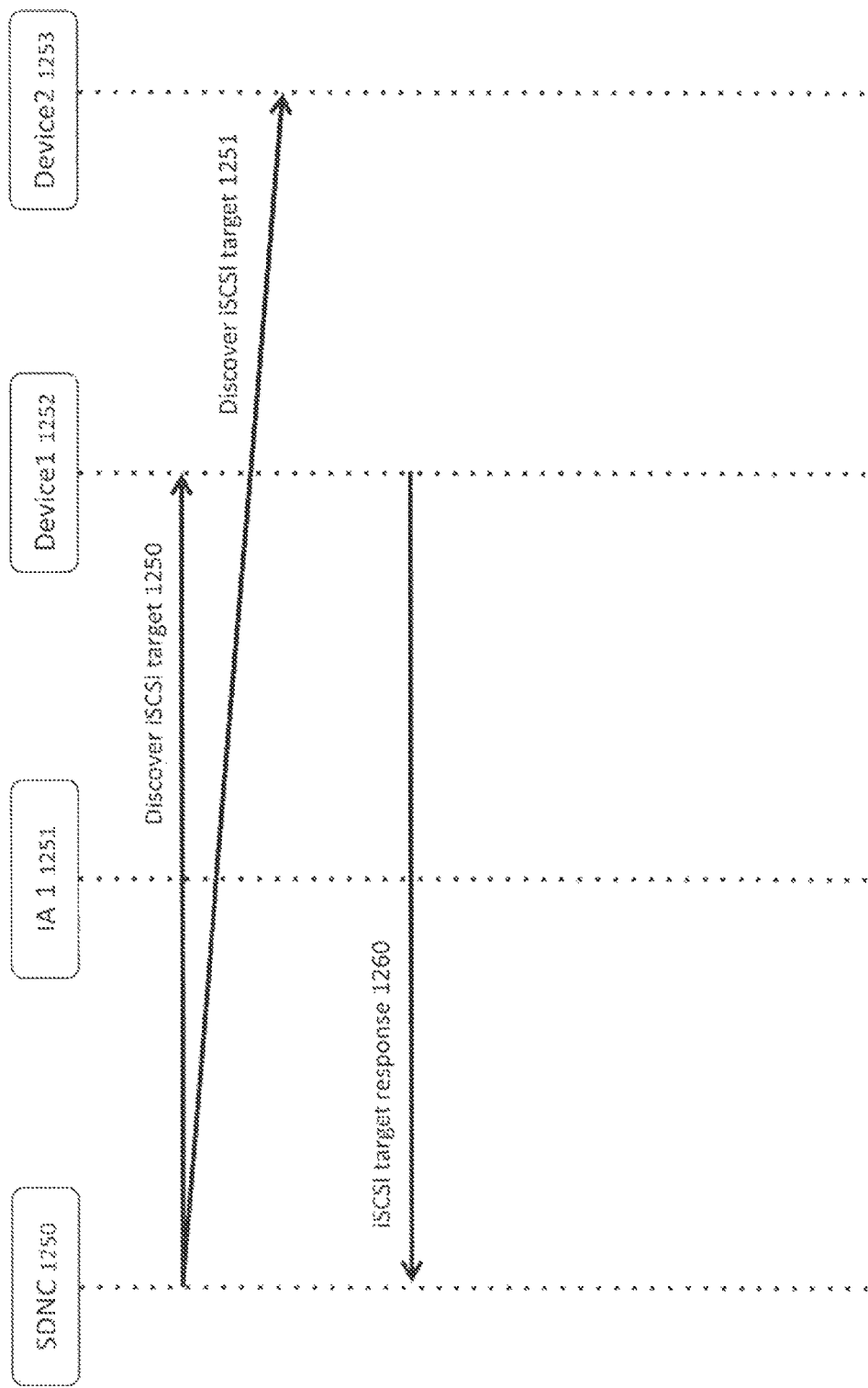
FIG. 12 is a sequence diagram showing iSCSI device discovery.

FIG. 12 is a sequence diagram showing iSCSI device or target discovery. The sequence diagram shows an SDNC 1250, Device 1 1252 and Device 2 1253. SDNC 1250 generates a discover iSCSI storage target command 1250 to Device 1 1252 and to 1251 Device 2 1253. Device 1 1252 responds to the SDNC 1250 with an iSCSI target response 1260.

Figure 13:
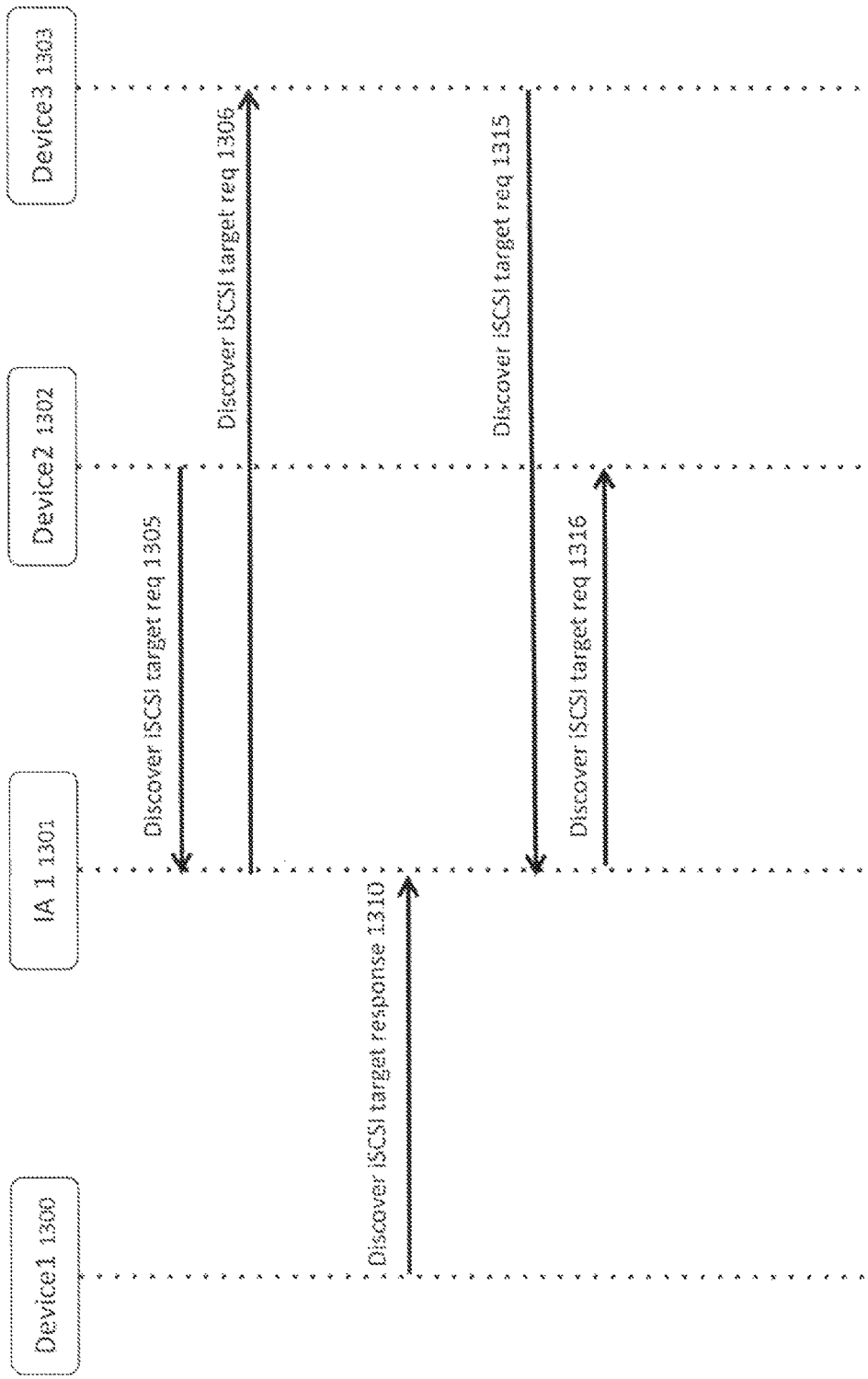
FIG. 13 is a sequence diagram showing iSCSI device discovery after switch security ACLs are configured.

FIG. 13 is a sequence diagram showing iSCSI device discovery after switch security ACLs are configured in a switch. The sequence shows a storage initiator 1301 and three devices, Device 1 1300, Device 2 1302 and Device 3 1303. Device 2 1302 originates a discover iSCSI storage target request 1305 command which is received by IA1 1301. IA1 1301 originates a discover iSCSI target request 1306 frame to Device 3 1303. Device 1 1300 originates a discover iSCSI target response frame 1310 to IA1 1301. Device 3 1303 originates a discover iSCSI target request frame 1315 to IA1 1301. IA1 1301 originates a discover iSCSI target request frame 1316 to Device 2 1302.

Figure 14:
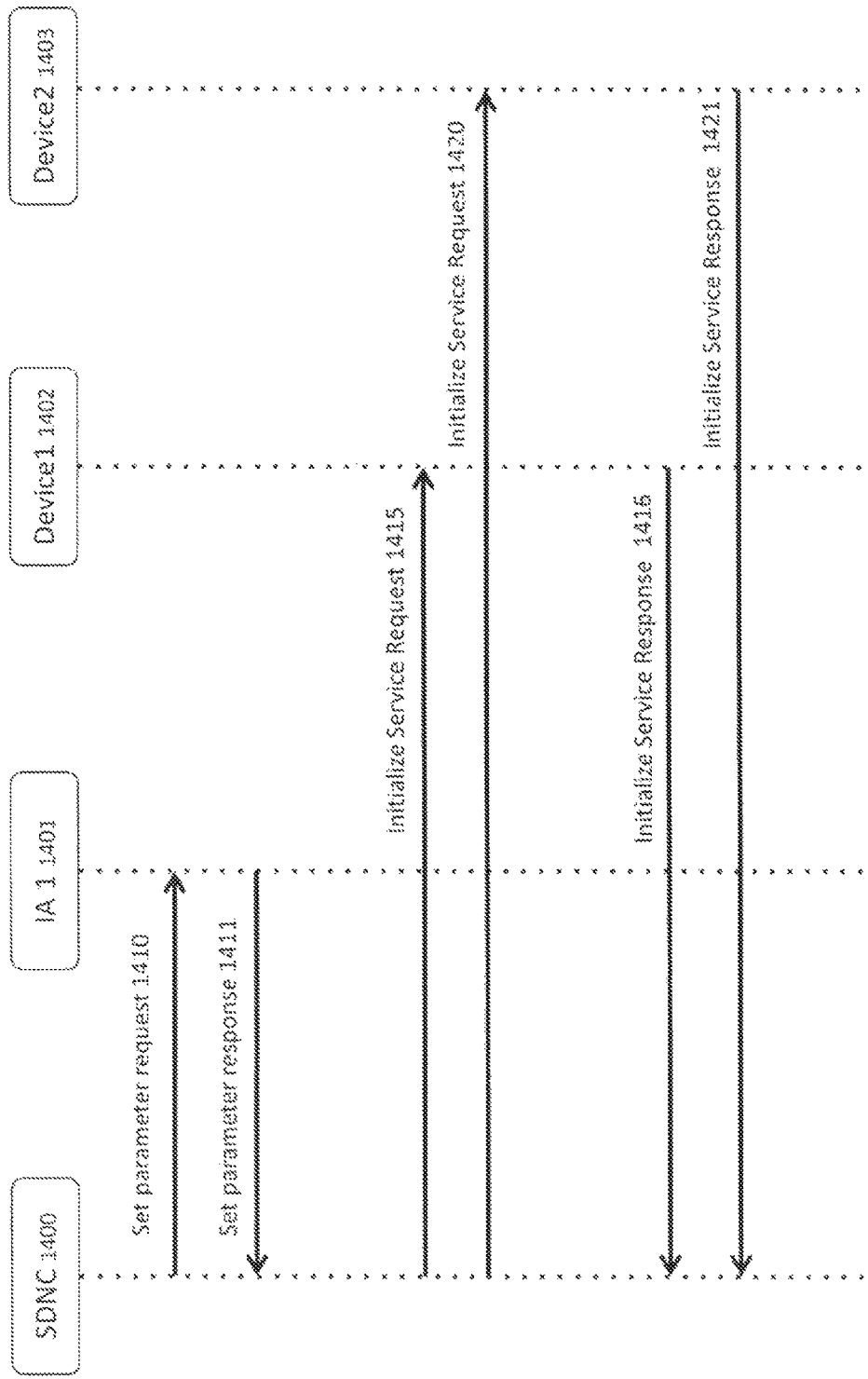
FIG. 14 is a sequence diagram of the software defined controller initializing devices.

FIG. 14 is a sequence diagram of the software defined controller initializing devices. This shows initializing the switch and devices, that is, the initiator script. SDNC 1400 originates a set parameter request 1410 to IA1 1401. IA1 1401 replies with a set parameter response frame 1411 to SDNC 1400, SDNC 1400 originates an initialize service request 1415 frame to Device 1 1402. SDNC 1400 originates an initialize service request 1420 to Device 2 1403. Device 1 1402 originates a initialize service response frame 1416 to SDNC 1400. Device 2 1402 originates an initialize service response 1421 frame to SDNC 1400.

Figure 15:
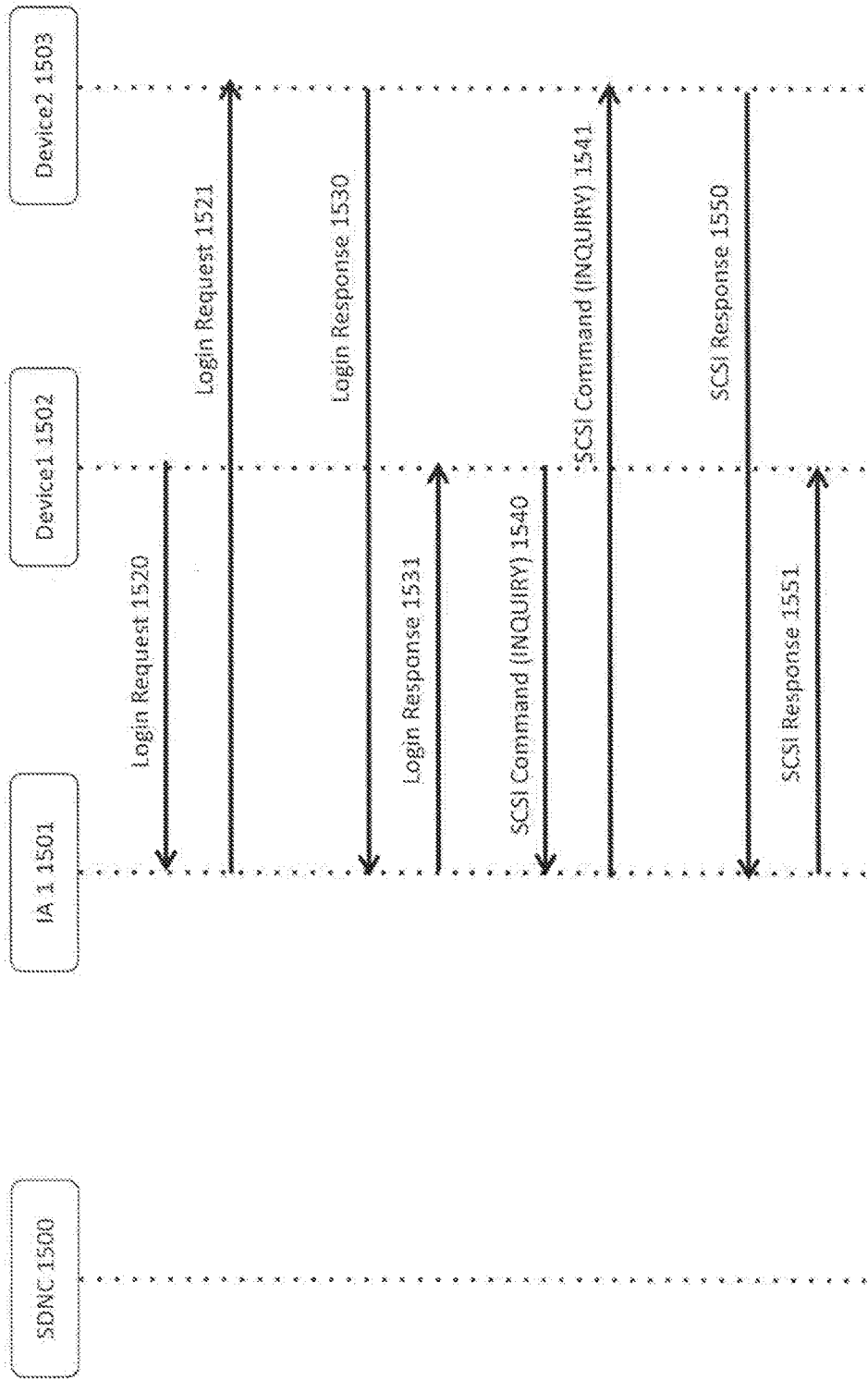
FIG. 15 is a sequence diagram showing LOGIN and SCSI COMMAND communications between device 1 and device 2.

FIG. 15 is a sequence diagram showing LOGIN and SCSI COMMAND communications between a storage target, IA1 1501, and storage initiators, Device 1 1502 and Device 2 1503. Device 1 and Device 2 communicate via TCAM rules that permit their communication. Storage Initiator Device 1 1502 originates a login request 1520 to storage target IA1 1501. Storage target IA1 1501 originates a login request 1521 to Device 2 1503. Device 2 1503 originates a login response 1530 to IA1 1501. IA1 1501 originates a login response 1531 to Device 1 1502. Device 1 1502 originates a SCSI command INQUIRY 1540 to IA1 1501. IA1 1501 originates a SCSI Command INQUIRY 1541 to Device 2 1503. Device 2 1503 originates a SCSI response 1550 to IA1 1501. IA1 1501 originates a SCSI Response 1551 to Device 1 1502.

Figure 16:
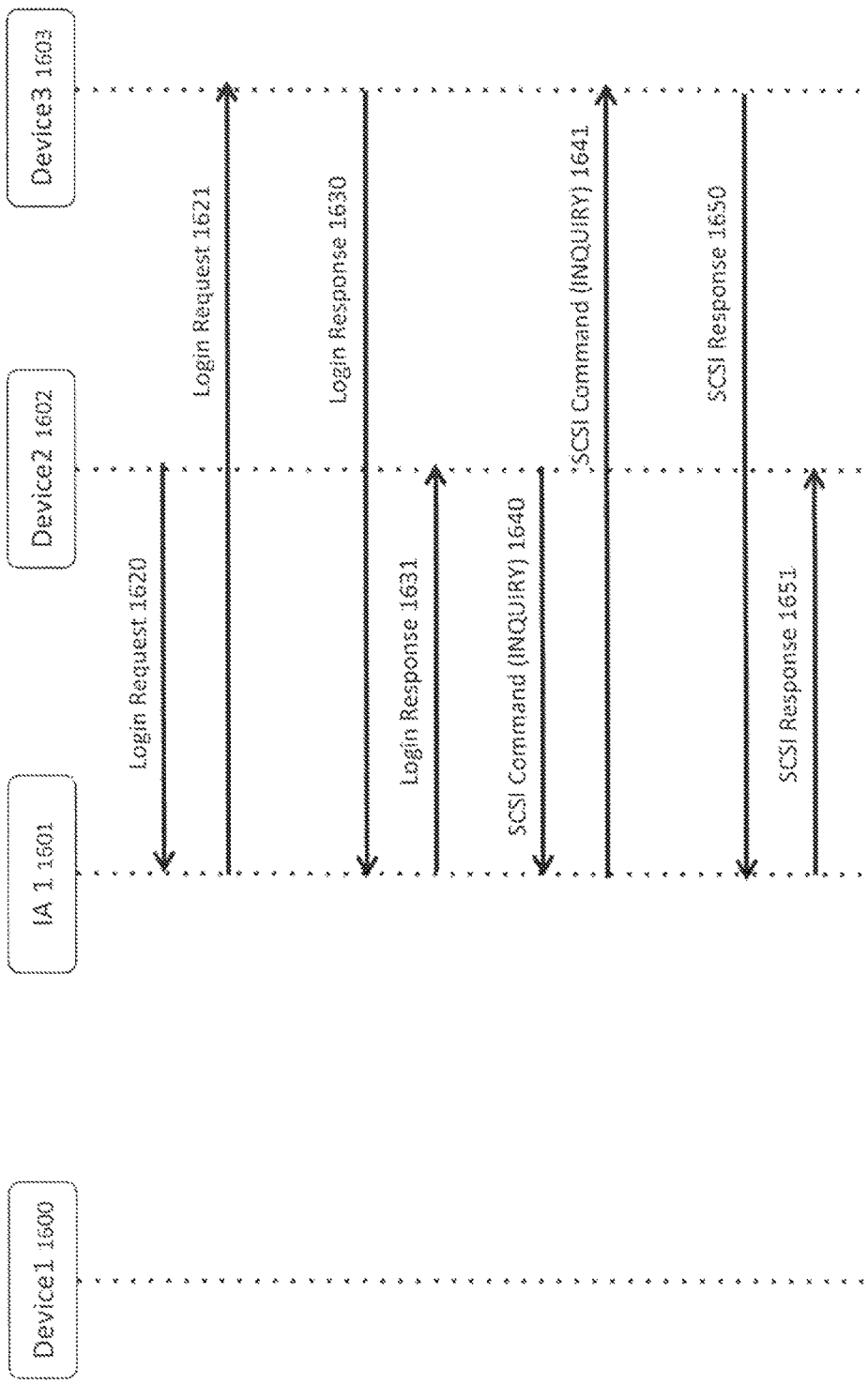
FIG. 16 is a sequence diagram showing LOGIN and SCSI COMMAND communications between device 2 and device 3.

FIG. 16 is a sequence diagram showing LOGIN and SCSI COMMAND communications between a storage target, IA1 1601, and storage initiators, Device 2 1602 and Device 3 1603. This provides for switching TCAM rules to isolate device 1 from devices 2 and 3. Storage Initiator Device 1 1600 is isolated from the communications by the switch TCAM entries. Device 2 1602 originates a login request 1620 to IA1 1601. IA1 1601 originates a login request frame 1621 to Devices 1603, Device 3 originates a login response frame 1630 to IA1 1601. IA1 1601 originates a login response frame 1631 to Device 2 1602. Device 2 1602 originates a SCSI command (INQUIRY) 1640 to IA1 1601. IA1 1601 originates a SCSI Command (INQUIRY) 1641 to Device 3 1603. Device 3 1603 originates a SCSI Response frame 1650 to IA1 1601. IA1 1601 originates a SCSI Response frame 1651 to Device 2 1602.

Figure 17:
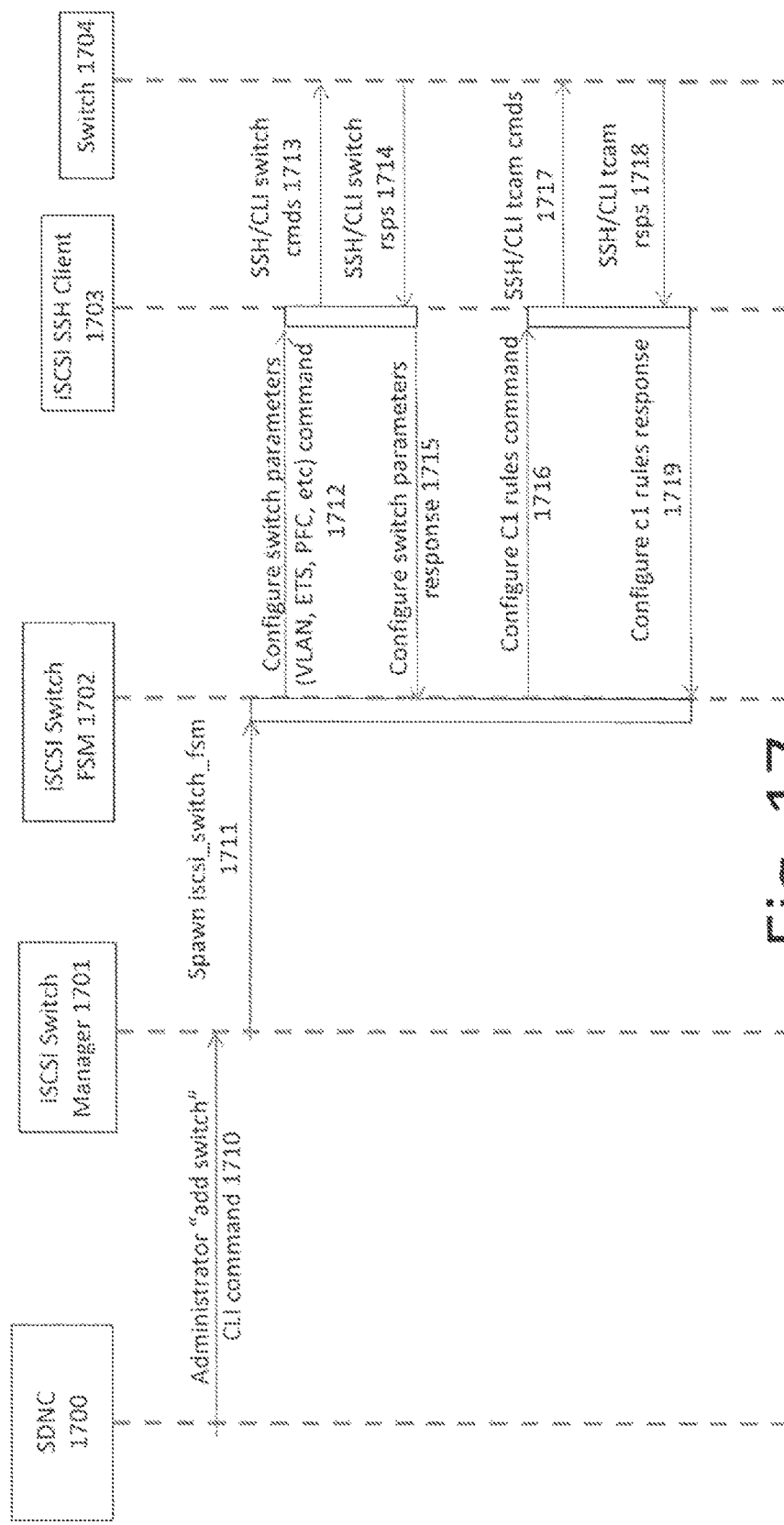
FIG. 17 is a sequence diagram showing a Software Defined Controller automating the configuration of an Ethernet switch using the Secure Shell protocol.

FIG. 17 is a sequence diagram showing a Software Defined Controller automating the configuration of an Ethernet switch using the Secure Shell protocol. SDNC 1700 originates an administrator "add switch" command 1710 to the iSCSI switch manager 1701. The iSCSI switch manager 1701 then spawns an iscsi_switch_fsm 1711 process. The iSCSI switch FSM process 1702 then originates a configure switch parameters command 1712 to the iSCSI SSH Client 1703, The configure switch parameters command may contain one or more of the following parameters to set: VLAN, ETS, PFC. The iSCSI iSSH Client 1703 sends the Switch 1704 one or more SSH commands 1713. The Switch 1704 responds to the commands 1714, The iSCSI SSH Client 1703 originates a configure switch parameters response 1715 to the iSCSI Switch FSM process 1702. The iSCSI Switch FSM 1702 process originates a configure C1 (TCAM) rules command to eh iSCSI SSH Client 1703. The iSCSI SSH Client 1703 originates one or more SSH set TCAM commands 1717 to the Switch 1704. The Switch 1704 optionally responds with one or more SSH TCAM set responses 1718. The iSCSI SSH Client 703 originates a configure C1 (TCAM) rules response 1719 to the iSCSI Switch FSM process 1702.

Figure 18:
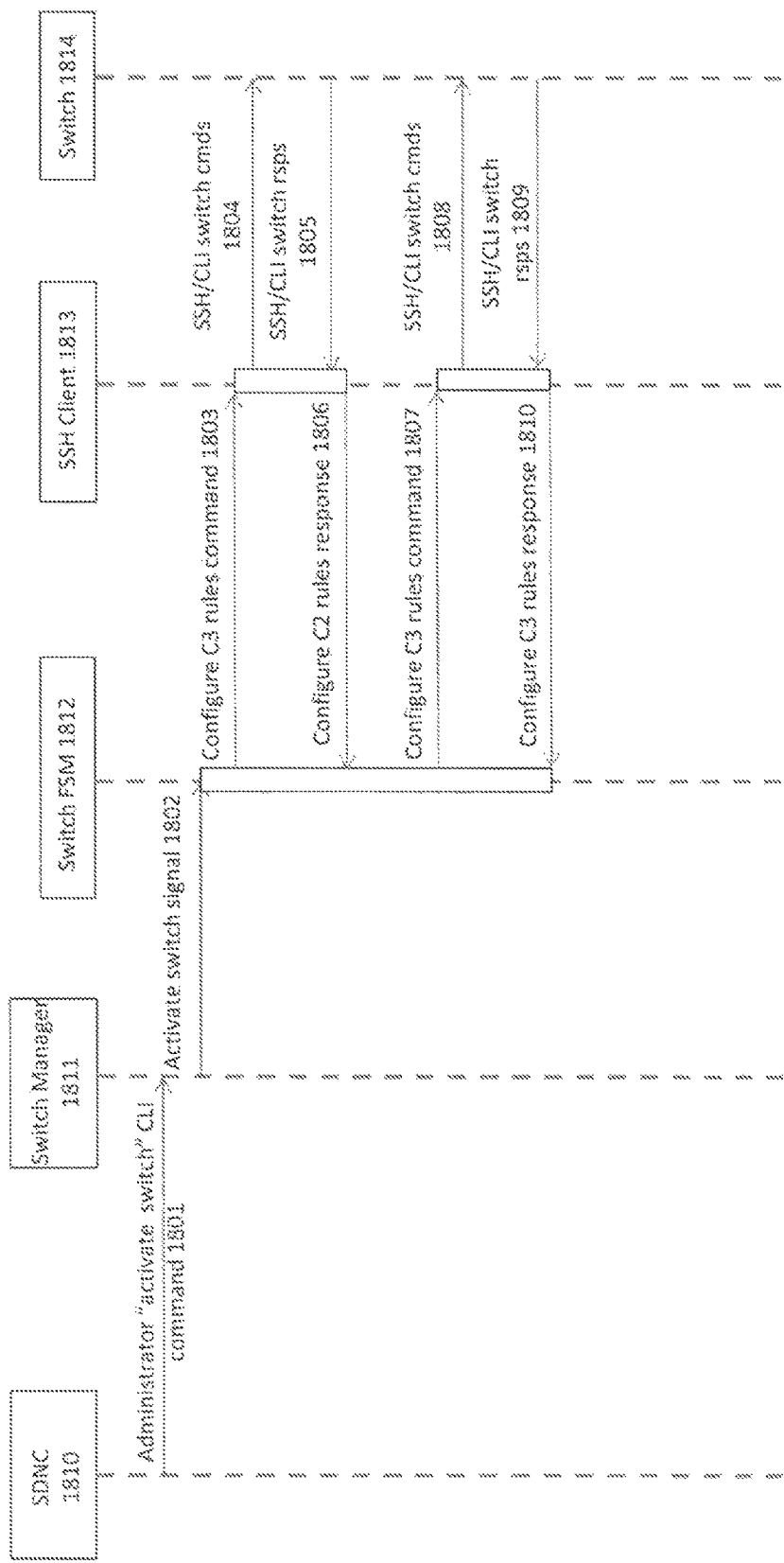
FIG. 18 is a sequence diagram showing the Software Defined Controller configuring a security overlay to isolate communicating devices.

FIG. 18 is a sequence diagram showing the Software Defined Controller configuring a security overlay to isolate communicating devices. The SDNC 1810 originates an administrator "activate switch" command 1801 to the Switch Manager 1811. The Switch Manager 1811 then originates an activate switch signal 1802 to the Switch FSM process 1812. The Switch FSM process 1812 then originates a configure C3 (TCAM) rules command 1803. The SSH Client 1813 then originates one or more SSH set switch commands 1804 to the Switch 1814. The Switch 1814 responds with one or more SSH set switch responses 1805. The SSH Client 1813 sends a configure C2 (TCAM) rules response 1806 to the Switch FSM 1812. The Switch FSM 1812 then originates a configure C3 (TCAM) rules command 1807 to the SSH Client 1813. The SSH Client 1813 then originates one or more SSH set switch commands 1808 to the Switch 1814. The Switch 1814 then responds with one or more SSH set switch responses 1809. The SSH Client 1813 then originates a configure C3 (TCAM) rules response 1810. The terms C1, C2 and C3 represent phases of TCAM programming. Many switches have a hierarchy of steps to set TCAM rules and the C1, C2 and C3 phases allow the SDNC 1810 to preserve the phases to set the switch parameters.

FIG. 19 is a diagram showing the Software Defined Controller dependencies for certain network and device actions. The diagram should be read left to right, the left most actions must be completed before the right actions can be executed. The fabric added 1900, switch added 1901 and switch reachable 1902 actions occur before the protocol security rules pushed 1903 (or configured or set) to the switch occur. When the previously mentioned events occur the fabric activated action can occur 1904, then the switch can be activated 1905. Alter the switch is activated 1905 and the following three events are executed: switch is configured 1906, DD set activated 1907 and the initiator/target device pair present 1908, then the device rules can be pushed 1909 (or configured or set).

Figure 20:
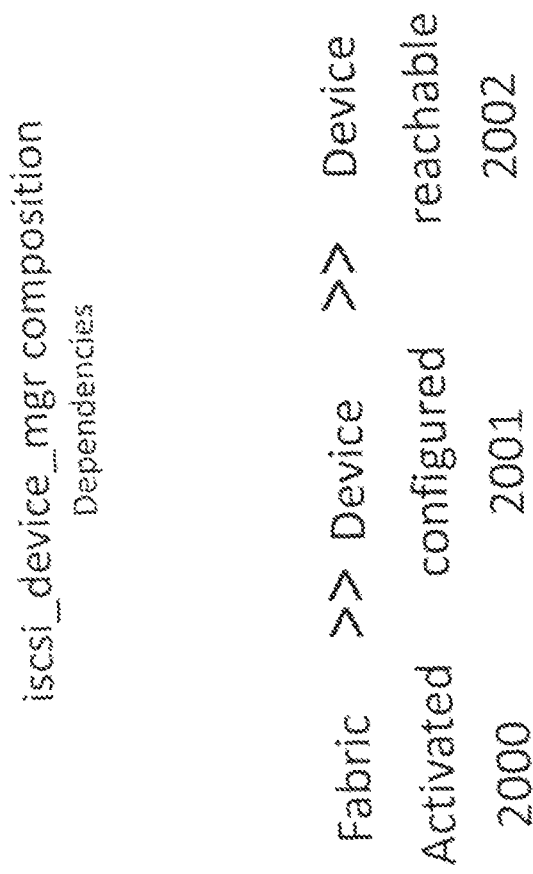
FIG. 20 is a diagram showing Software Defined Controller dependencies for certain network and device actions.

FIG. 20 is a diagram showing Software Defined Controller dependencies for certain network and device actions. The fabric needs to be activated before the device is configured. The device is configured before the device is polled for reachability. The dependencies shown include the first being the fabric is activated 2000, then the device can be configured 2001, then the device is reachable 2002.

Figure 21:
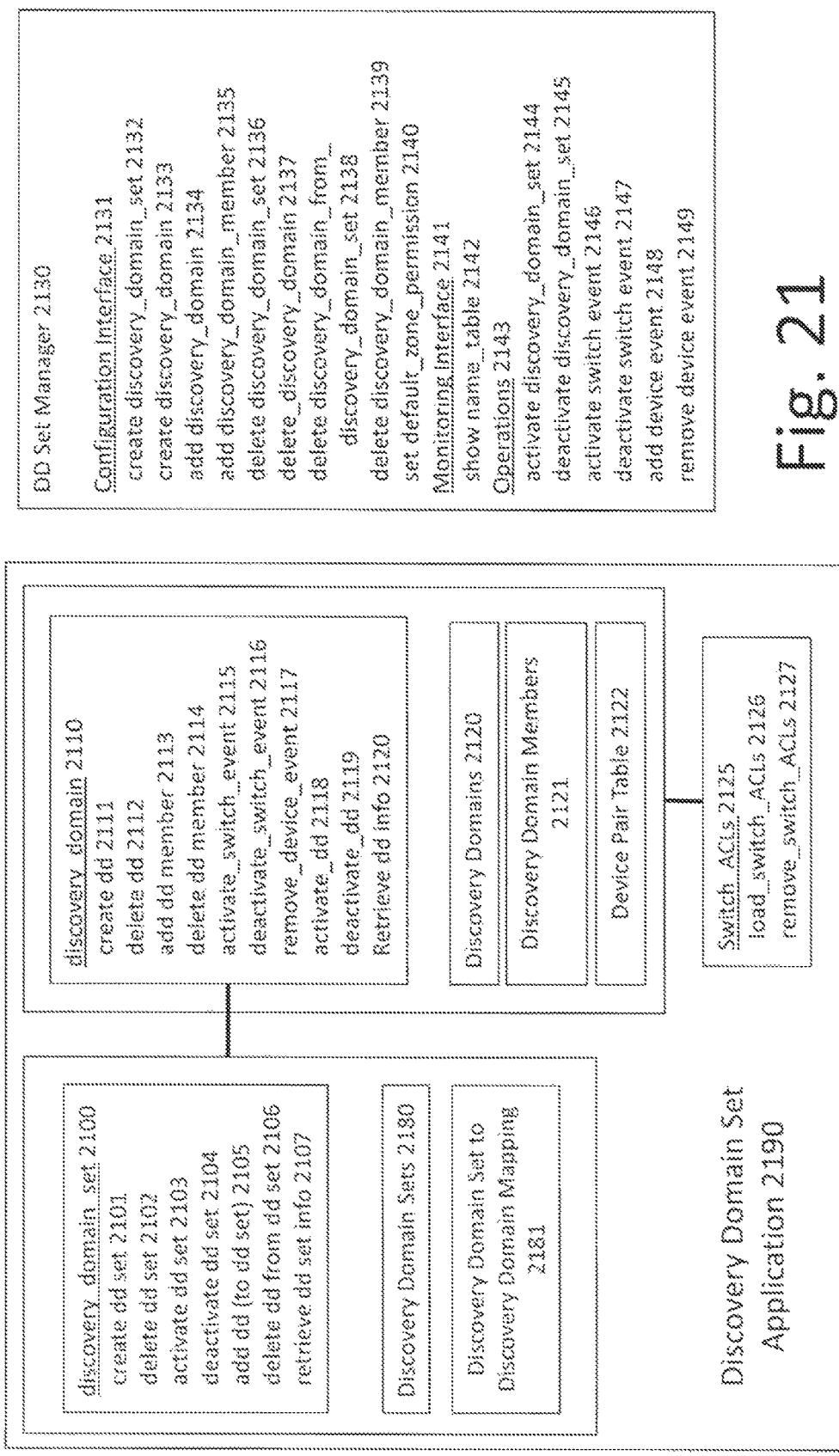
FIG. 21 is a diagram showing Software Defined Controller iSCSI data structures and dependencies for the implementation of Discovery Domain Sets, Discovery Domains and Discovery Domain Members.

FIG. 21 is a diagram showing Software Defined Controller iSCSI data structures and dependencies for the implementation of Discovery Domain Sets, Discovery Domains and Discovery Domain Members. The SDNC administrator process allows the user to configurate the Discovery Domain Sets, Domains and Members. The SDNC administrator creates internal data structures and TCAM (ACL) entries to program the network to allow communications between devices allowed as described in the Discovery Domain Set 2100, Discovery Domain 2110 and the DD Set Manager 2130. The switch ACL's 2125 are contained in tables in the SDNC and loaded 2126 and removed 2127 into and from the switches based on the Discovery Domain commands 2110. The Device Pair Table 2122 contain descriptions of initiator and target pairs, where TCAM rules are created to allow communications between them.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

I claim:

1. A system for interconnecting Internet Small Computer Systems Interface ("iSCSI") devices via a plurality of switches, comprising:
    a first iSCSI device,
    a second iSCSI device,
    a software defined network controller (SDNC) apparatus, the SDNC including an application for managing flow control of the switches for connection of the iSCSI devices,
    a network function virtualization (NFV) apparatus, the NFV being coupled to the SDNC,
    a switch, the switch comprising:
        a first port adapted to transmit and receive iSCSI frames, the first iSCSI device is coupled to the first port of the switch,
        a second port adapted to transmit and receive iSCSI frames, the second iSCSI device is coupled to the second port of the switch, and
        a ternary content addressable memory ("TCAM") table,
    the SDNC apparatus being coupled to the switch, the SDNC operatively communicating with the TCAM table,
    the SDNC communicating with the first iSCSI device and the second iSCSI device to send commands to notify the first and second iSCSI devices with information about each other, and
    the SDNC communicating with the switch including the TCAM table, providing configuration parameters to allow the first iSCSI device to communicate with the second iSCSI device through the switch.

2. The system of claim 1 wherein the SDNC sends commands to the switch to configure one or more of the following: access control list ("ACL"), link aggregation groups ("LAG"), maximum transfer unit ("MTU") size, Spanning Tree Protocol ("STP"), Link Level Discovery Protocol ("LLDP"), Data Center Bridge Exchange protocol ("DCBx"), Virtual Local Area Network ("VLAN") types and tagging, traffic class, Class of Service ("COS") queues, port splitting, Link Aggregation Control Protocol ("LACP") LACP mode, LAG load balancing.

3. A method for forwarding Internet Small Computer Interface ("iSCSI") iSCSI frames between at least a first iSCSI device and a second iSCSI device, by a switch, the switch including a Ternary Content Addressable Memory ("TCAM"), under control of a Software Defined Network Controller ("SDNC"), the SDNC including an application for managing flow control of the switches for connection of the iSCSI devices, a network function virtualization (NFV) apparatus coupled to the SDNC, the method comprising:
    receiving commands at the switch to configure the TCAM tables from the SDNC,
    receiving an iSCSI frame by the switch from the first iSCSI device coupled to the switch,
    the switch looking up and matching the received iSCSI frame by one or more of the fields in a TCAM table entry,
    the said TCAM table entry was added from a command send from the SDNC,
    the NFV performing higher network functions, and
    forwarding the received iSCSI frame to a second iSCSI device coupled to the switch.

4. The method of claim 3 wherein the SDNC commands to the switch contains one or more of the following parameters: source Media Access Control ("MAC") address, destination MAC address, source Internet Protocol ("IP") IP address, destination IP address, source Transmission Control Protocol Internet Protocol ("TCPIP") port, destination TCPIP port.

* * * * *